US008923235B2

(12) United States Patent
Chun et al.

(10) Patent No.: US 8,923,235 B2
(45) Date of Patent: Dec. 30, 2014

(54) METHOD AND APPARATUS FOR ALLOCATING RESOURCES FOR UPLINK CONTROL CHANNEL IN WIRELESS COMMUNICATION SYSTEM

(75) Inventors: Jin Young Chun, Anyang-si (KR); Jin Sam Kwak, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 13/695,789

(22) PCT Filed: May 6, 2011

(86) PCT No.: PCT/KR2011/003375
§ 371 (c)(1),
(2), (4) Date: Nov. 1, 2012

(87) PCT Pub. No.: WO2011/142555
PCT Pub. Date: Nov. 17, 2011

(65) Prior Publication Data
US 2013/0044725 A1    Feb. 21, 2013

Related U.S. Application Data

(60) Provisional application No. 61/332,824, filed on May 10, 2010.

(30) Foreign Application Priority Data

Mar. 24, 2011  (KR) ........................ 10-2011-0026463

(51) Int. Cl.
*H04W 4/00* (2009.01)
*H04L 5/00* (2006.01)
*H04L 1/16* (2006.01)
*H04W 72/04* (2009.01)
*H04L 1/00* (2006.01)

(52) U.S. Cl.
CPC ............ *H04L 5/0053* (2013.01); *H04L 1/1671* (2013.01); *H04W 72/0453* (2013.01); *H04L 1/0026* (2013.01)
USPC ............ 370/329; 370/338; 370/341; 370/348

(58) Field of Classification Search
CPC  H04W 72/0453; H04L 1/1671; H04L 5/0053
USPC ................ 370/252, 328, 329, 335; 455/67.11
See application file for complete search history.

(56) References Cited

U.S. PATENT DOCUMENTS 8,331,248 B2 * 12/2012 Hosein ......................... 370/252
2007/0202882 A1   8/2007 Ju et al.
(Continued)

FOREIGN PATENT DOCUMENTS

JP    2008-042861    2/2008
JP    2009-111493    5/2009
(Continued)

OTHER PUBLICATIONS

Japan Patent Office Application Serial No. 2013-507894, Office Action dated Oct. 2, 2013, 3 pages.
(Continued)

*Primary Examiner* — Brian D Nguyen
*Assistant Examiner* — Toan Nguyen
(74) *Attorney, Agent, or Firm* — Lee, Hong, Degerman, Kang & Waimey

(57) ABSTRACT

A method and apparatus for allocating a resource for an uplink control channel in a wireless communication system is provided. The method includes allocating a first resource for an uplink control channel and a second resource for a dynamic ranging channel. The second resource is located right after the first resource.

11 Claims, 7 Drawing Sheets

(56) References Cited

U.S. PATENT DOCUMENTS

| | | | |
|---|---|---|---|
| 2007/0274265 A1* | 11/2007 | Yoon et al. | 370/335 |
| 2008/0101211 A1 | 5/2008 | Rao | |
| 2009/0116434 A1 | 5/2009 | Lohr et al. | |
| 2010/0027462 A1* | 2/2010 | Lee et al. | 370/328 |
| 2010/0227565 A1* | 9/2010 | Sun et al. | 455/67.11 |
| 2010/0272036 A1* | 10/2010 | Ramakrishna | 370/329 |

FOREIGN PATENT DOCUMENTS

| | | |
|---|---|---|
| JP | 2010-539780 | 12/2010 |
| JP | 2011-511527 | 4/2011 |
| JP | 2011-524694 | 9/2011 |
| JP | 2011-527548 | 10/2011 |
| WO | 2009/035246 | 3/2009 |
| WO | 2009/104895 | 8/2009 |
| WO | 2009/155210 | 12/2009 |
| WO | 2010/005225 | 1/2010 |

OTHER PUBLICATIONS

In the PCT International Search Report Application No. WO 2011/142555 dated Jan. 11, 2012, 3 pages.

* cited by examiner

METHOD AND APPARATUS FOR ALLOCATING RESOURCES FOR UPLINK CONTROL CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2011/003375, filed on May 6, 2011, which claims the benefit of earlier filing date and right of priority to Korean Patent Application No. 10-2011-0026463, filed on Mar. 24, 2011, and also claims the benefit of U.S. Provisional Application Ser. No. 61/332,824, filed on May 10, 2010, the contents of which are all hereby incorporated by reference herein in their entirety.

TECHNICAL FIELD

The present invention relates to wireless communication, and more particularly, to a method and apparatus for allocating resources for an uplink control channel in a wireless communication system.

BACKGROUND ART

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

A control channel can be used for transmission of various type of control signal for communication between a base station and a mobile station. Examples of the uplink control channel are various such as a fast feedback channel, a hybrid automatic repeat request (HARM) feedback channel, a sounding channel, a ranging channel, a bandwidth request channel, etc.

The ranging channel can be used for uplink synchronization. The ranging channel can be classified into a non-synchronized ranging channel (NS-RCH) and a synchronized ranging channel (S-RCH). The NS-RCH can be used for initial access and handover. A mobile station shall not transmit any other uplink burst or uplink control channel signal in the AAI subframe where it transmits a ranging signal by using the NS-RCH. The S-RCH can be used for periodic ranging.

Meanwhile, an IEEE 802.16m system can support not only an MS supporting the IEEE 802.16m system, but also an MS supporting an IEEE 802.16e system because it has backward compatibility. A case in which the IEEE 802.16m system supports the 802.16e mobile station can be referred to as a legacy support mode.

Resource allocation method for a ranging channel in legacy support mode is required.

SUMMARY OF INVENTION

Technical Problem

The present invention provides a method and apparatus for allocating resources for an uplink control channel in a wireless communication system. In particular, there is provided a method of allocating resources for a dynamic ranging channel in a legacy support mode supporting an Institute of Electrical and Electronics Engineers (IEEE) 802.16e mobile station.

Solution to Problem

In an aspect, a method for allocating a resource for an uplink control channel in a wireless communication system is provided. The method include allocating a first resource for an uplink control channel and a second resource for a dynamic ranging channel, the second resource being located right after the first resource.

The first resource and the second resource may include at least one distributed logical resource unit (DLRU) respectively, the second resource being located right after the first resource on a DLRU index in a frequency domain.

An index of the at least one DLRU included in the first resource may be smaller than an index of the at least one DLRU included in the second resource.

The DLRU may include six distributed tiles in the frequency domain, each of the tiles including four consecutive subcarriers.

The uplink control channel may include at least one of a ranging channel, a feedback channel, and a bandwidth request channel.

The feedback channel may include a hybrid automatic repeat request (HARQ) feedback channel (HFBCH) carrying an acknowledgement (ACK)/non-acknowledgement (NACK) signal for HARQ feedback, and a fast feedback channel (FFBCH) carrying channel quality information (CQI) or the like.

The method may further comprising allocating a third resource for a data channel over which data is transmitted, the third resource being located right after the second resource.

The first resource and the second resource may be resources for a first system, and the first resource and the second resource may be multiplexed with a fourth resource for a second system, different from the first system, through a frequency division multiplexing (FDM) scheme.

In another aspect, a method for transmitting, by a mobile station, a ranging signal in a wireless communication system is provided. The method include transmitting a ranging signal to a base station over an allocated dynamic ranging channel, a second resource for the dynamic ranging channel being located right after a first resource for an uplink control channel.

The first resource and the second resource may include at least one distributed logical resource unit (DLRU) respectively, the second resource being located right after the first resource on a DLRU index in a frequency domain.

An index of the at least one DLRU included in the first resource may be smaller than an index of the at least one DLRU included in the second resource.

The DLRU may include six distributed tiles in the frequency domain, each of the tiles including four consecutive subcarriers.

The method may further comprising transmitting data to the base station over a data channel, a third resource for the data channel being located right after the second resource.

The first resource and the second resource may be resources for a first system, and the first resource and the second resource may be multiplexed with a fourth resource for a second system, different from the first system, through a frequency division multiplexing (FDM) scheme.

In another aspect, a mobile station in a wireless communication system is provided. The mobile station include a Radio Frequency (RF) unit configured for transmitting or receiving a radio signal, and a processor, coupled to the RF unit, and configured for transmitting a ranging signal to a base station over an allocated dynamic ranging channel, wherein a second resource for the dynamic ranging channel is located right after a first resource for an uplink control channel.

Advantageous Effects of Invention

In a legacy support mode, a dynamic ranging channel for a legacy mobile station may be allocated without signaling overhead.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the IEEE 802.16m. However, technical features of the present invention are not limited thereto.

Figure 1:
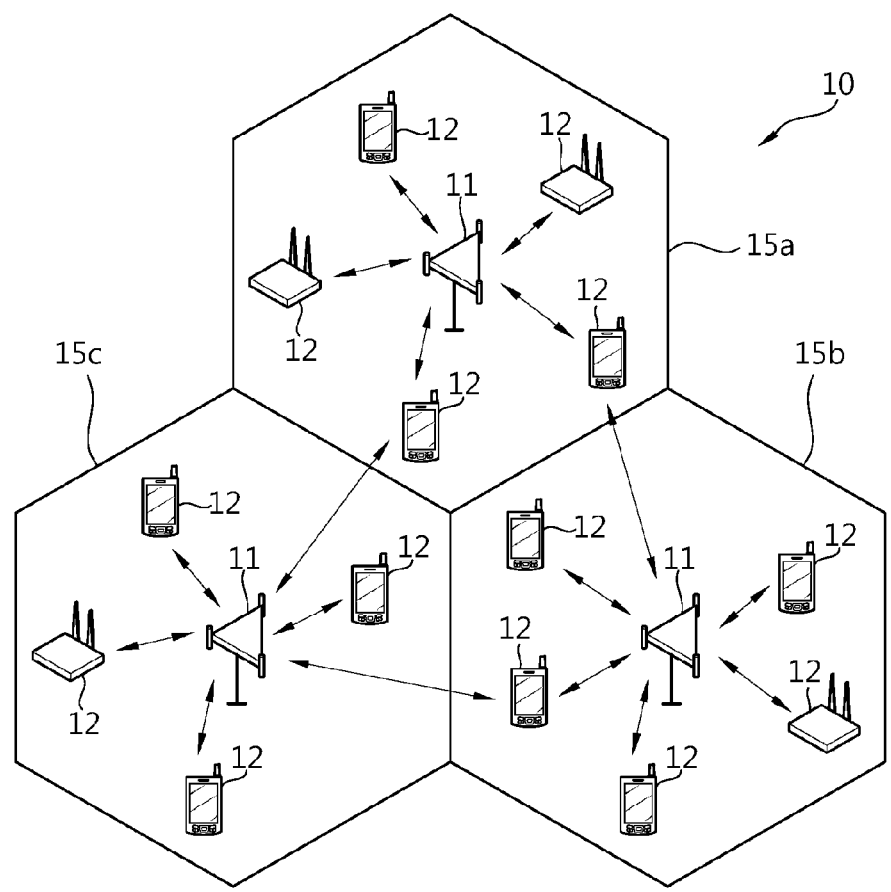
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
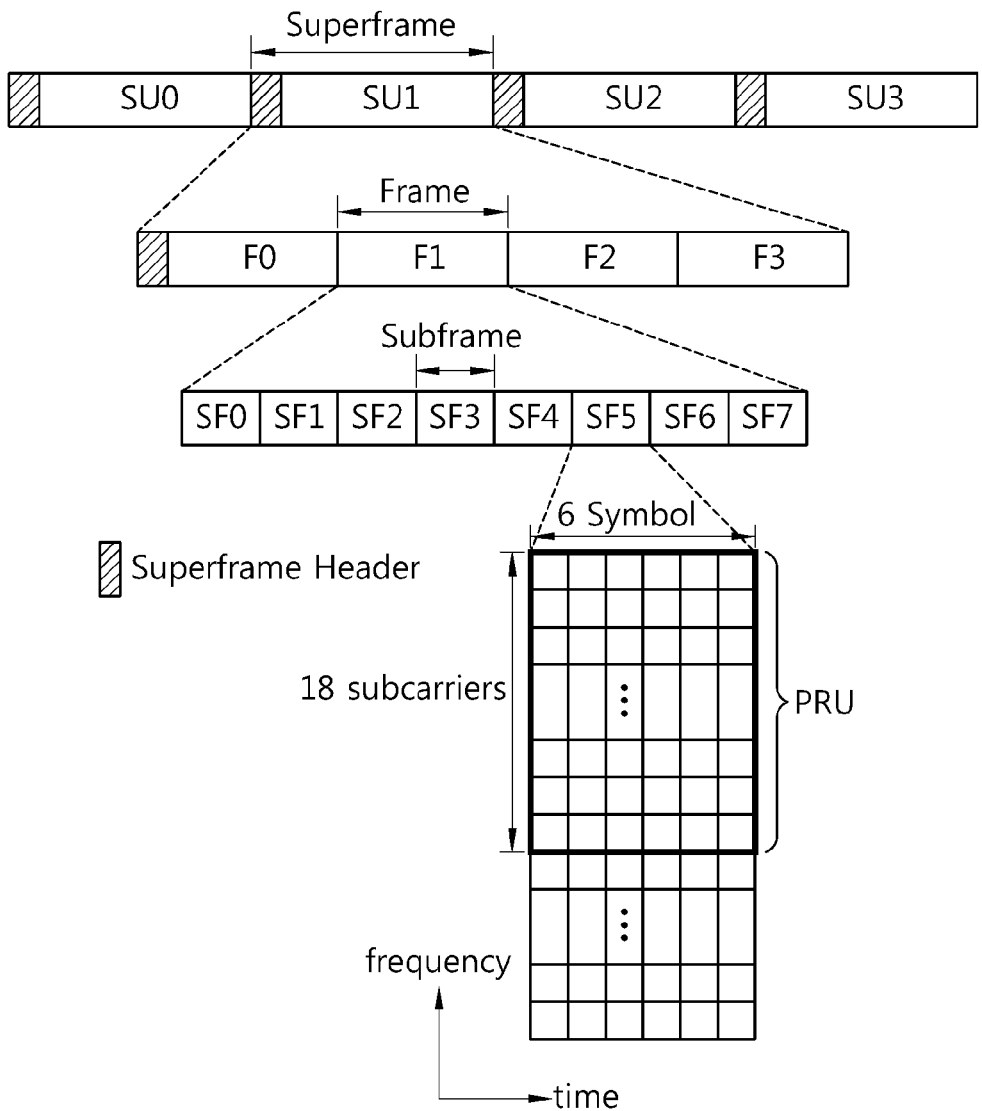
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) can carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH can be transmitted in every superframe. Information transmitted on the S-SFH can be classified into three sub-packets. i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP1 may be transmitted with period of 40 ms. The S-SFH SP2 includes information on initial network entry and network discovery. The S-SFH SP2 may be transmitted with period of 80 ms. The S-SFH SP3 includes other important system information. The S-SFH SP1 may be transmitted with period of either 160 ms or 320 ms.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | | Channel bandwidth, BW (MHz) | | | | |
|---|---|---|---|---|---|---|---|
| | | | 5 | 7 | 8.75 | 10 | 20 |
| Sampling factor, n | | | 28/25 | 8/7 | 8/7 | 28/25 | 28/25 |
| Sampling frequency, Fs (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf (kHz) | | | 10.94 | 7.81 | 9.77 | 10.94 | 10.94 |
| Useful symbol time, Tb (μs) | | | 91.4 | 128 | 102.4 | 91.4 | 91.4 |
| G = 1/8 | Symbol time, Ts (μs) | | 102.857 | 144 | 115.2 | 102.857 | 102.857 |
| | FDD | Number of OFDMA symbols per 5 ms frame | 48 | 34 | 43 | 48 | 48 |
| | | Idle time (μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (μs) | 165.714 | 248 | 161.6 | 165.714 | 165.714 |
| G = 1/16 | Symbol time, Ts (μs) | | 97.143 | 136 | 108.8 | 97.143 | 97.143 |
| | FDD | Number of OFDMA symbols per 5 ms frame | 51 | 36 | 45 | 51 | 51 |
| | | Idle time (μs) | 45.71 | 104 | 104 | 45.71 | 45.71 |
| | TDD | Number of OFDMA symbols per 5 ms frame | 50 | 35 | 44 | 50 | 50 |
| | | TTG + RTG (μs) | 142.853 | 240 | 212.8 | 142.853 | 142.853 |
| G = 1/4 | Symbol time, Ts (μs) | | 114.286 | 160 | 128 | 114.286 | 114.286 |
| | FDD | Number of OFDMA symbols per 5 ms frame | 43 | 31 | 39 | 43 | 43 |
| | | Idle time (μs) | 85.694 | 40 | 8 | 85.694 | 85.694 |
| | TDD | Number of OFDMA symbols per 5 ms frame | 42 | 30 | 38 | 42 | 42 |
| | | TTG + RTG (μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000) 8000. A subcarrier spacing is defined as $\Delta f = F_s/N_{FFT}$. A useful symbol time is defined as Tb=1/$\Delta f$. A CP time is defined as Tg=G·Tb. An OFDMA symbol time is defined as Ts=Tb+Tg. A sampling time is defined as Tb/$N_{FFT}$.

Figure 3:
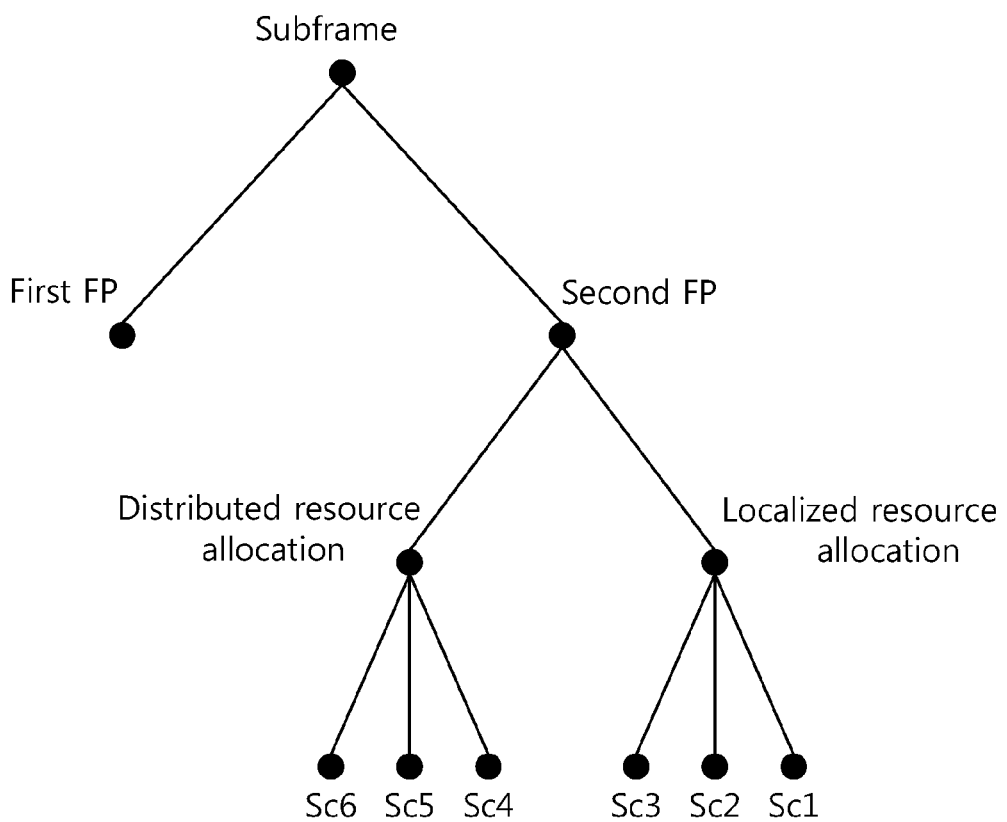
FIG. 3 shows an example of an uplink radio resource.

FIG. 3 shows an example of an uplink radio resource.

Each uplink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed PRUs. Each frequency partition may be used for other purposes such as fractional frequency reuse (FFR). The second frequency partition (i.e., FP2) of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations. The LRU size for control channel transmission should be same as for data transmission. Multiple users are allowed to share one control LRU.

A distributed logical resource unit (DLRU) can be used to obtain a frequency diversity gain. An uplink DLRU may consist of subcarriers included in 3 tiles distributed in one frequency partition. The tile is a basic unit of constituting the uplink DLRU. The tile can be defined 6 subcarriers and Nsym OFDMA symbol.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU.

Hereinafter, a legacy support mode supporting not only a mobile station belonging to an IEEE 802.16m system (hereinafter, referred to as a 16m mobile station) but also a mobile station belonging to an IEEE 802.16e system (hereinafter, referred to as a 16e mobile station) will be described. Furthermore, the IEEE 802.16m system may be referred to as an Advanced Air interface (AAI) system, and the IEEE 802-16e system may be referred to as a WirelessMAN-FDMA system or a legacy system.

Figure 4:
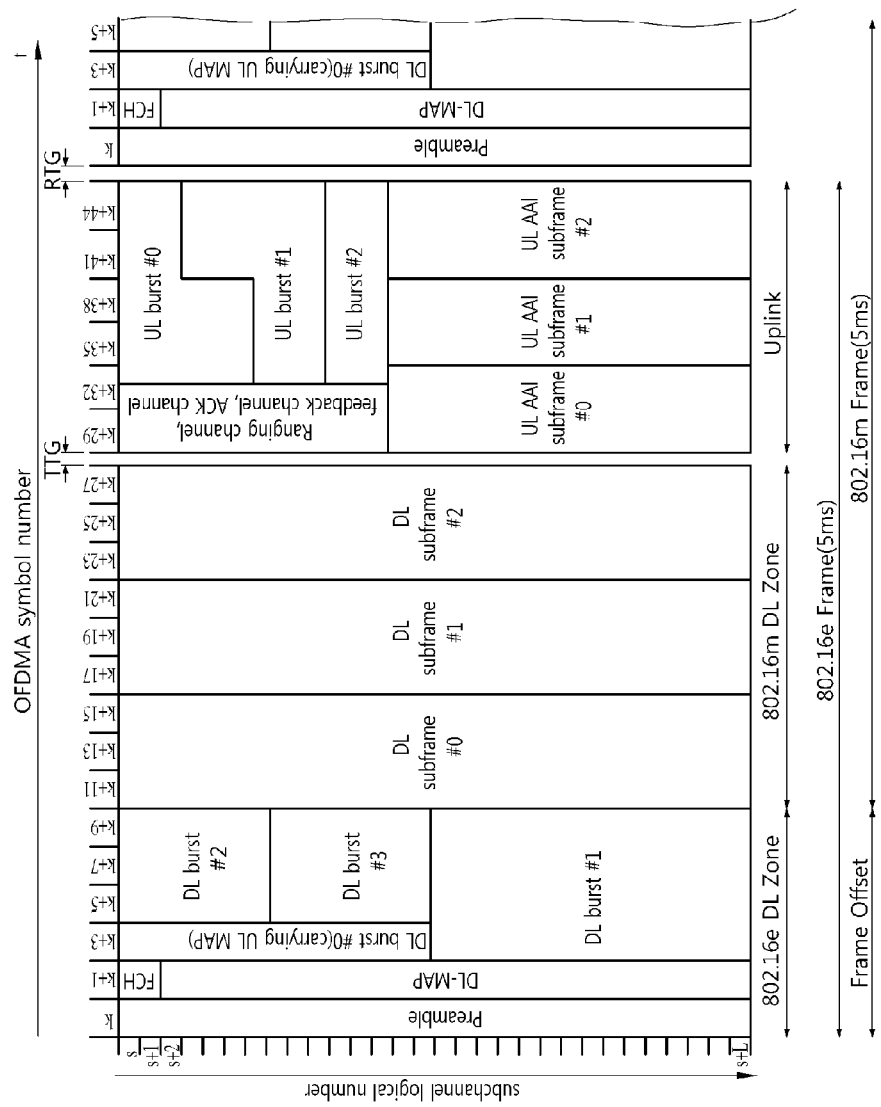
FIG. 4 illustrates another example of a frame structure.

FIG. 4 illustrates another example of a frame structure. The frame structure depicted in FIG. 4 represents a TDD frame structure in the case where Uplink (UL) partially Used Sub-carrier (PUSC) permutation is supported in the legacy support mode, and a legacy region and an AAI region are multiplexed in an uplink through a Frequency Division Multiplexing (FDM) scheme.

Referring to FIG. 4, a frame includes a downlink (DL) subframe and an uplink (UL) subframe. The DL subframe temporally precedes the UL subframe. The DL subframe begins with a preamble, a Frame Control Header (FCH), a Downlink (DL)-MAP, an Uplink (UL)-MAP, and a burst region in order. The UL subframe includes an uplink control channel such as a ranging channel and a feedback channel, and a burst region, and the like. The guard time for distinguishing between the DL subframe and the UL subframe is inserted in the middle of the frame (between DL and DL subframes) and in the last part thereof (next to UL subframe). A Transmit/Receive Transition Gap (TTG) is a gap between a downlink burst and a subsequent uplink burst. A Receive/Transmit Transition Gap (RTG) is a gap between an uplink burst and a subsequent downlink burst. The downlink region and the uplink region are each divided into a portion for a 16e mobile station and a portion for a 16m mobile station. In the downlink region, a preamble, an FCH, a DL-MAP, a UL-MAP and a downlink burst region are for the 16e mobile station, and the rest of the downlink region is for the 16m mobile station. In the uplink region, an uplink control channel and an uplink burst region are for the 16e mobile station, and the rest of the uplink region is for the 16m mobile station. In the uplink region, a region for the 16e mobile station and a region for the 16m mobile station may be multiplexed through various schemes. In FIG. 4, the uplink region is multiplexed through a FDM scheme, but the present invention is not limited thereto. The uplink region may be multiplexed through a Time Division Multiplexing (TDM) scheme.

In the uplink, in the case where the legacy region and the AAI region in the uplink are multiplexed through the FDM scheme, a subcarrier group including multiple subcarriers, namely, a subchannel, is allocated to at least one legacy region. Other subchannels including multiple subcarriers form UL subframes and allocated to the AAI region. When a bandwidth is 5, 7, 10 or 20 MHz, every UL subframe becomes a type-1 subframe. That is, it includes six OFDMA symbols. When the bandwidth is 8.75 MHz, the first UL subframe is a type-1 subframe and the rest become type-4 subframes. A control channel and a burst for mobile stations may be scheduled in a subchannel in the legacy region or in a subchannel in the AAI region according to a mode in which a mobile station is connected to a base station. However, the subchannel in the legacy region and the subchannel in the AAI region are not scheduled in the same frame. Meanwhile, in FIG. 4, the legacy region and the AAI region are multiplexed through the FDM scheme. This is considered to be multiplexing on a logical subchannel index through the FDM scheme, but on a physical subchannel index, they may exist in a mixed manner.

The preamble is used for initial synchronization between a base station and a mobile station, cell search, frequency offset, and channel estimation. The FCH contains information regarding a length of a DL-MAP message, and a coding scheme of the DL-MAP. The DL-MAP is a region in which the DL-MAP message is transmitted. The DL-MAP message defines access to a downlink channel. This means that the DL-MPA message defines an indication and/or control information with respect to the downlink channel. The DL-MAP message includes a configuration change count of a Downlink channel Descriptor (DCD) and a base station Identifier (ID). The DCD describes a DL burst profile applied to a current map. The downlink burst profile refers to characteristics of a downlink physical channel, and the DCD is periodically transmitted by a base station through a DCD message. The UL-MAP is a region in which a UL-MAP message is transmitted. The UL-MAP message defines access to an uplink channel. This means that the UL-MAP message defines an indication and/or control information with respect to the uplink channel. The UL-MAP message includes a configuration change count of an Uplink Channel Descriptor (UCD), and an allocation start time of uplink allocation defined by the UL-MAP. The UCD describes an uplink burst profile. The uplink burst profile refers to characteristics of an uplink physical channel, and the UCD is periodically transmitted to a base station through a UCD message. The downlink burst is a region in which data sent by a base station to a mobile station is transmitted, and the uplink burst is a region in which data sent by a mobile station to a base station is transmitted. The fast feedback region is included in an UL burst region of an FDM frame. The fast feedback region is used for the transmission of information requiring fast response from a base station. The fast feedback region may be used for Channel Quality Indicator (CQI) transmission. The location of the fast feedback region may be fixed within the OFDM frame, or may be variable.

In the legacy support mode, a new symbol structure may be presented. Multiple subcarriers may be divided into the $N_{g,left}$ number of left guard subcarriers, the $N_{g,right}$ number of right guard subcarriers, and the $N_{used}$ number of used subcarriers. The used subcarriers may be divided into a plurality of Partial Usage of Subchannels (PUSC) tiles.

Figure 5:
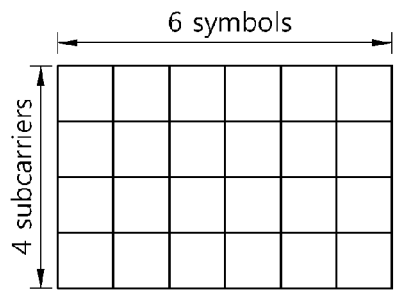
FIG. 5 illustrates one example of a tile structure of the legacy region in the legacy support mode and the AAI region multiplexed by the FDM scheme.

FIG. 5 illustrates one example of a tile structure of the legacy region in the legacy support mode and the AAI region multiplexed by the FDM scheme. Unlike a general tile structure, the tiles depicted in FIG. 5 may include four consecutive subcarriers, and six OFDMA symbols. In the legacy support mode, a Distributed Logical Resource Unit (DLRU) of the AAI region may include six tiles.

Meanwhile, in the legacy region, there are six tiles where subchannels, basic resource allocation units, are dispersed. A single tile has four consecutive subcarriers and three OFDMA symbols. The DLRU and the subchannel are determined in position on a frequency axis, according to a PUSC permutation rule of a legacy system.

A control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols×subcarriers) of IEEE 802.16e=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols×subcarriers)=6×2, 3×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

Examples of the uplink control channel used in the IEEE 802.16m system include a feedback channel comprising a fast feedback channel (FFBCH) and a hybrid automatic repeat request (HARQ) feedback control channel (HFBCH), a sounding channel, a ranging channel, a bandwidth request channel (BRCH), etc. Information such as a channel quality indicator (CQI), a multiple-input multiple-output (MIMO) feedback, an acknowledgement/non-acknowledgement (ACK/NACK), an uplink synchronization signal, a bandwidth request, etc. may be transmitted over the uplink control channel. The feedback channel and the bandwidth request channel are allocated in first 6 symbols of any subframe when sounding channel is not allocated.

Figure 6:
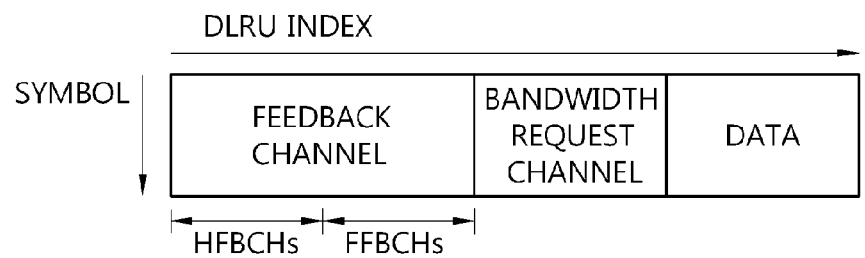
FIGS. 6 and 7 illustrate the allocation of an uplink control channel and an uplink data channel within a DLRU of a frequency partition of a UL subframe.
Figure 7:
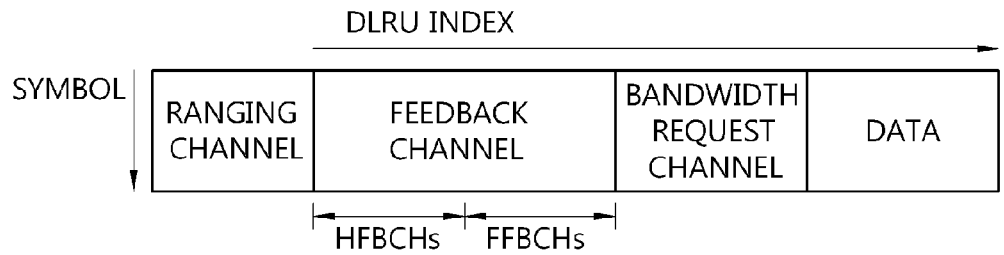

FIGS. 6 and 7 illustrate the allocation of an uplink control channel and an uplink data channel within a DLRU of a frequency partition of a UL subframe.

The DLRU of an uplink frequency partition may be divided into a data region, a bandwidth request region and a feedback region. The feedback region including a feedback channel may be used for fast feedback or transmission of HARQ acknowledgement(ACK)/Non-acknowledgement(NACK).

FIG. 6 illustrates one example of the order of the allocation of an uplink control channel in a system supporting only a 16m mobile station. In FIG. 6, in the frequency partition, the uplink control channel is allocated in the order starting from a DLRU with a lowest index, namely, in the order of a HARQ feedback channel, a fast feedback channel, a bandwidth request channel and a data channel.

FIG. 7 illustrates one example of the order of the allocation of an uplink control channel in the case where a UL PUSC permutation is supported in the legacy support mode, and a legacy region and an AAI region are multiplexed in the uplink through the FDM scheme. Referring to FIG. 7, a ranging channel is allocated to a DLRU with the lowest index. After the ranging channel, the allocation is made in the order of an increase in the DLRU index, that is, in the order of an HARQ feedback channel, a fast feedback channel, a bandwidth request channel and a data channel. If the ranging channel is not allocated, as in FIG. 6, the allocation begins with the HARQ feedback channel being allocated to the DLRU with the lowest index.

Meanwhile, when a mobile station attempts a handover, a dynamic ranging channel may be assigned. The dynamic ranging channel may be assigned by a broadcast assignment A-MAP Information Element (IE). The broadcast assignment A-MAP IE assigns resources for a broadcast burst. By the broadcast assignment A-MAP IE, a ranging opportunity, an index of a subframe to which the dynamic ranging channel is assigned, or the like may be presented. That is, the number of dynamic ranging channels and the location in a time region where the dynamic ranging channel is assigned may be indicated. However, in the case in which the UL PUSC permutation is supported in the legacy support mode, and the legacy region and the AAI region are multiplexed in the uplink by the FDM scheme, it has not been specifically determined to which part of a frequency region the dynamic ranging channel is allocated. Therefore, a method of assigning a dynamic ranging channel is required.

The mobile station, when attempting a handover, receives a neighbor advertisement message (MOB_NBR-ADV message) from a base station through Media Access Control (MAC). The neighbor advertisement message may refer to Section 6.3.2.3.42 of the IEEE std 802.16™-2009 (revision of IEEE std 802.16-2004). The neighbor advertisement message may be periodically transmitted. The neighbor advertisement message identifies a network and defines characteristics a neighbor cell with respect to a mobile station that potentially attempts initial network access or handover. The mobile station may obtain information regarding SFH or a broadcast message of a target cell by the neighbor advertisement message. Accordingly, the mobile station may learn, in advance, which DLRU of the frequency domain the uplink control channel is assigned to in the target cell.

Since the mobile station is aware of the location of the uplink control channel in the frequency domain, the location of the dynamic ranging channel may also be determined based on a relative location with respect to the uplink control channel the location of which has already been known. The use of the relative location of the dynamic ranging channel may reduce signaling overhead further than in the case of indicating the absolute index of the DLRU to which the dynamic ranging channel is assigned. For example, the dynamic ranging channel may be a region neighboring a region including a regular ranging channel, a feedback channel and a bandwidth request channel. Since information regarding the location, size and presence of each of the regular ranging channel, the feedback channel and the bandwidth request channel can be learned by the neighbor advertisement message, the relative location of the dynamic ranging channel can be contributive to accurately determining the location of the DLRU to which the dynamic ranging channel is assigned.

Figure 8:
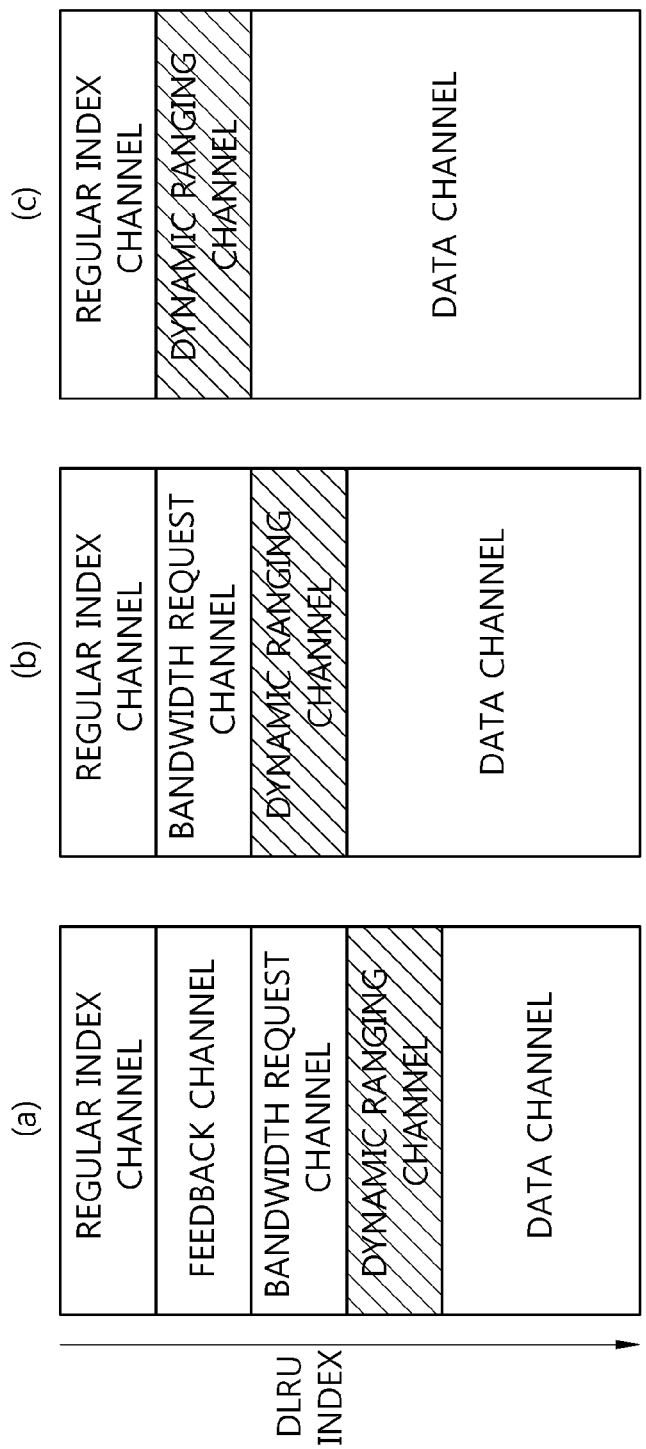
FIG. 8 illustrates one example of the assignment of the dynamic ranging channel and the uplink control channel according to the proposed method for allocating resources.

FIG. 8 illustrates one example of the assignment of the dynamic ranging channel and the uplink control channel according to the proposed method for allocating resources.

In FIG. 8A, the uplink control channel is assigned in the order of an increase in a DLRU index, that is, in the order of the regular ranging channel, the feedback channel and the bandwidth request channel. The dynamic ranging channel is assigned over the DLRU index right after the uplink control channel. After the dynamic ranging channel, a data channel is assigned. In FIG. 8B, the uplink control channel is assigned in the order of an increase in the DLRU index, that is, in the order of the feedback channel and the bandwidth request channel. The dynamic ranging channel is assigned right after the uplink control channel on the DLRU index. After the dynamic ranging channel, the data channel is assigned. In FIG. 8C, the uplink control channel includes the feedback channel only, and the feedback channel is assigned to a DLRU of the lowest index. The dynamic ranging channel is assigned right after the feedback channel on the DLRU index. After the dynamic ranging channel, the data channel is assigned. That is, regardless of the configuration of the uplink control channel, the dynamic ranging channel is assigned right after the uplink control channel on the DLRU index. Since the dynamic ranging channel is assigned based on a relative location with respect to the uplink control channel as described above, signaling overhead can be reduced.

In FIG. 8 the uplink control channel, the dynamic ranging channel and the data channel have been described as being allocated in the order of an increase in the DLRU index. However, the present invention is not limited thereto. That is, the uplink control channel, the dynamic ranging channel and the data channel may be assigned in a frequency region, starting from the DLRU with the highest index in the order of a decrease in the DLRU index.

Figure 9:
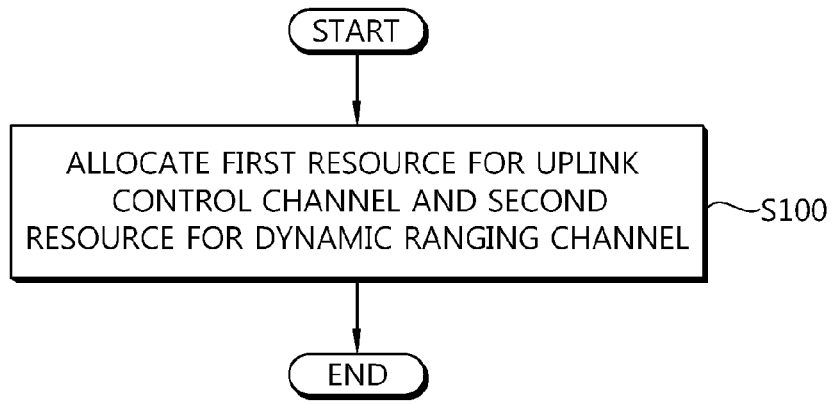
FIG. 9 illustrates one embodiment of the proposed method for allocating resources.

FIG. 9 illustrates one embodiment of the proposed method for allocating resources.

In S100, a base station allocates a first resource for an uplink control channel and a second resource for a dynamic ranging channel into a frame. In this case, the second resource is located right after the first resource. On the DLRU index, the second resource may be located right after the first resource.

As for another method for allocating a dynamic ranging channel, a regular ranging channel may be used as it is. That is, the location and size of the regular ranging channel are fixed in each subframe. If the regular ranging channel exists in each subframe, a corresponding resource is allocated to the regular ranging channel, and if the dynamic ranging channel exists, the corresponding resource is allocated to the dynamic ranging channel. If both the regular ranging channel and the dynamic ranging channel are not present, the corresponding resource may be used as a resource for another channel such as a data channel.

Figure 10:
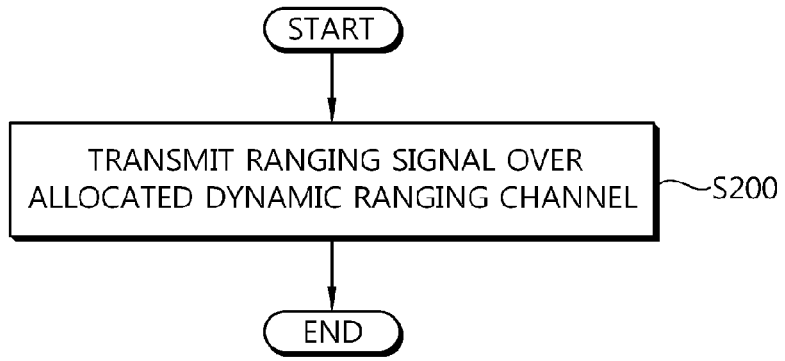
FIG. 10 illustrates one embodiment of the proposed method for transmitting a ranging signal.

FIG. 10 illustrates one embodiment of the proposed method for transmitting a ranging signal.

In S200, the mobile station transmits a ranging signal to a base station over an allocated dynamic ranging channel. In this case, the second resource for the dynamic ranging channel is located right after the first resource for the uplink control channel.

Figure 11:
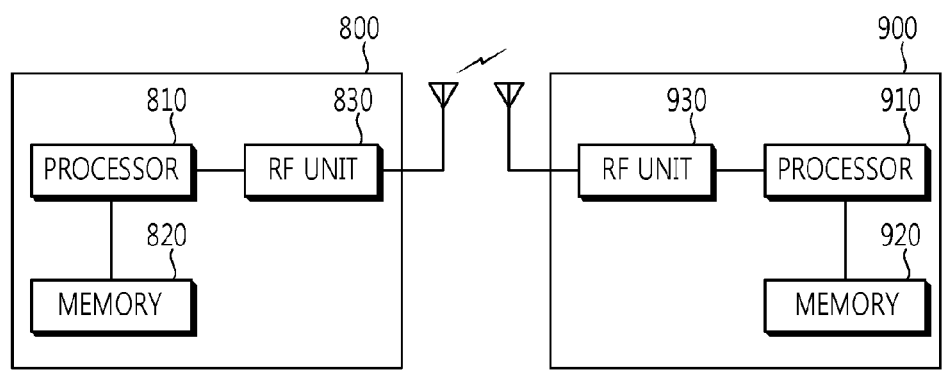
FIG. 11 is a block diagram showing wireless communication system to implement an embodiment of the present invention.

FIG. 11 is a block diagram showing wireless communication system to implement an embodiment of the present invention.

A base station 80 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 820. The RF unit 830 is operatively coupled with the processor 810, and transmits and/or receives a radio signal.

A user equipment 900 may include a processor 910, a memory 920 and a RF unit 930. The processor 910 may be configured to implement proposed functions, procedures and/or methods described in this description. Layers of the radio interface protocol may be implemented in the processor 910. The processor 910 is coupled to the RF unit, and configured for transmitting a ranging signal to a base station over an allocated dynamic ranging channel. A second resource for the dynamic ranging channel is located right after a first resource for an uplink control channel. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

The invention claimed is:

1. A method for allocating a resource for an uplink control channel in a wireless communication system, the method comprising:
allocating a first resource for an uplink control channel and a second resource for a dynamic ranging channel, the second resource being located right after the first resource,
wherein the first resource and the second resource include at least one distributed logical resource unit (DLRU) respectively, the second resource being located right after the first resource on a DLRU index in a frequency domain, and
wherein an index of the at least one DLRU included in the first resource is smaller than an index of the at least one DLRU included in the second resource.

2. The method of claim 1, wherein the DLRU includes six distributed tiles in the frequency domain, each of the tiles including four consecutive subcarriers.

3. The method of claim 1, wherein the uplink control channel includes at least one of a ranging channel, a feedback channel, and a bandwidth request channel.

4. The method of claim 3, wherein the feedback channel includes a hybrid automatic repeat request (HARQ) feedback channel (HFBCH) carrying an acknowledgement (ACK)/non-acknowledgement (NACK) signal for HARQ feedback, and a fast feedback channel (FFBCH) carrying channel quality information (CQI).

5. The method of claim 1, further comprising allocating a third resource for a data channel over which data is transmitted, the third resource being located right after the second resource.

6. The method of claim 1, wherein the first resource and the second resource are resources for a first system, and the first resource and the second resource are multiplexed with a fourth resource for a second system, different from the first system, through a frequency division multiplexing (FDM) scheme.

7. A method for transmitting, by a mobile station, a ranging signal in a wireless communication system, the method comprising:
transmitting a ranging signal to a base station over an allocated dynamic ranging channel, a second resource for the dynamic ranging channel being located right after a first resource for an uplink control channel,
wherein the first resource and the second resource include at least one distributed logical resource unit (DLRU) respectively, the second resource being located right after the first resource on a DLRU index in a frequency domain, and
wherein an index of the at least one DLRU included in the first resource is smaller than an index of the at least one DLRU included in the second resource.

8. The method of claim 7, wherein the DLRU includes six distributed tiles in the frequency domain, each of the tiles including four consecutive subcarriers.

9. The method of claim 7, further comprising transmitting data to the base station over a data channel, a third resource for the data channel being located right after the second resource.

10. The method of claim 7, wherein the first resource and the second resource are resources for a first system, and the first resource and the second resource are multiplexed with a fourth resource for a second system, different from the first system, through a frequency division multiplexing (FDM) scheme.

11. A mobile station in a wireless communication system, comprising:
a Radio Frequency (RF) unit configured for transmitting or receiving a radio signal; and
a processor, coupled to the RF unit, and configured for transmitting a ranging signal to a base station over an allocated dynamic ranging channel,
wherein a second resource for the dynamic ranging channel is located right after a first resource for an uplink control channel,
wherein the first resource and the second resource include at least one distributed logical resource unit (DLRU) respectively, the second resource being located right after the first resource on a DLRU index in a frequency domain, and
wherein an index of the at least one DLRU included in the first resource is smaller than an index of the at least one DLRU included in the second resource.

* * * * *